United States Patent [19]
Carmignani et al.

[11] 3,957,017
[45] May 18, 1976

[54] CONTAMINANT FILTER IN A CLOSED-LOOP AQUACULTURE SYSTEM

[75] Inventors: Garibaldi M. Carmignani, Woodside; James C. McCarty, San Carlos; George Monaco, Los Altos, all of Calif.

[73] Assignee: Syntex (U.S.A.) Inc., Palo Alto, Calif.

[22] Filed: Nov. 4, 1974

[21] Appl. No.: 518,821

[52] U.S. Cl. .................................... 119/3; 119/5
[51] Int. Cl.[2] .................................. A01K 61/00
[58] Field of Search ............... 119/5, 3; 210/169

[56] References Cited
UNITED STATES PATENTS

| | | | |
|---|---|---|---|
| 3,661,262 | 5/1972 | Sanders | 119/5 |
| 3,720,319 | 3/1973 | White | 210/169 |
| 3,741,158 | 6/1973 | Moe, Jr. et al. | 119/3 |

FOREIGN PATENTS OR APPLICATIONS

| | | | |
|---|---|---|---|
| 858,127 | 1/1961 | United Kingdom | 210/DIG. 5 |

*Primary Examiner*—Hugh R. Chamblee
*Attorney, Agent, or Firm*—Tom M. Moran

[57] ABSTRACT

This invention is drawn to the use of an open-cell, polyurethane foam to remove dissolved contaminants from water in an aquaculture system. The foam is made by suitably reacting a hydroxylated ether with a diisocyanate. The foam filter is particularly useful in a water purification system which is a combination of a biological filter, a protein skimmer, and the polyurethane foam filter and such a combination forms the basis of a closed-loop aquaculture system. A process for removing dissolved contaminants in an aquaculture system is disclosed along with a process for growing aquatic animals in a system using the polyurethane foam filter.

15 Claims, 2 Drawing Figures

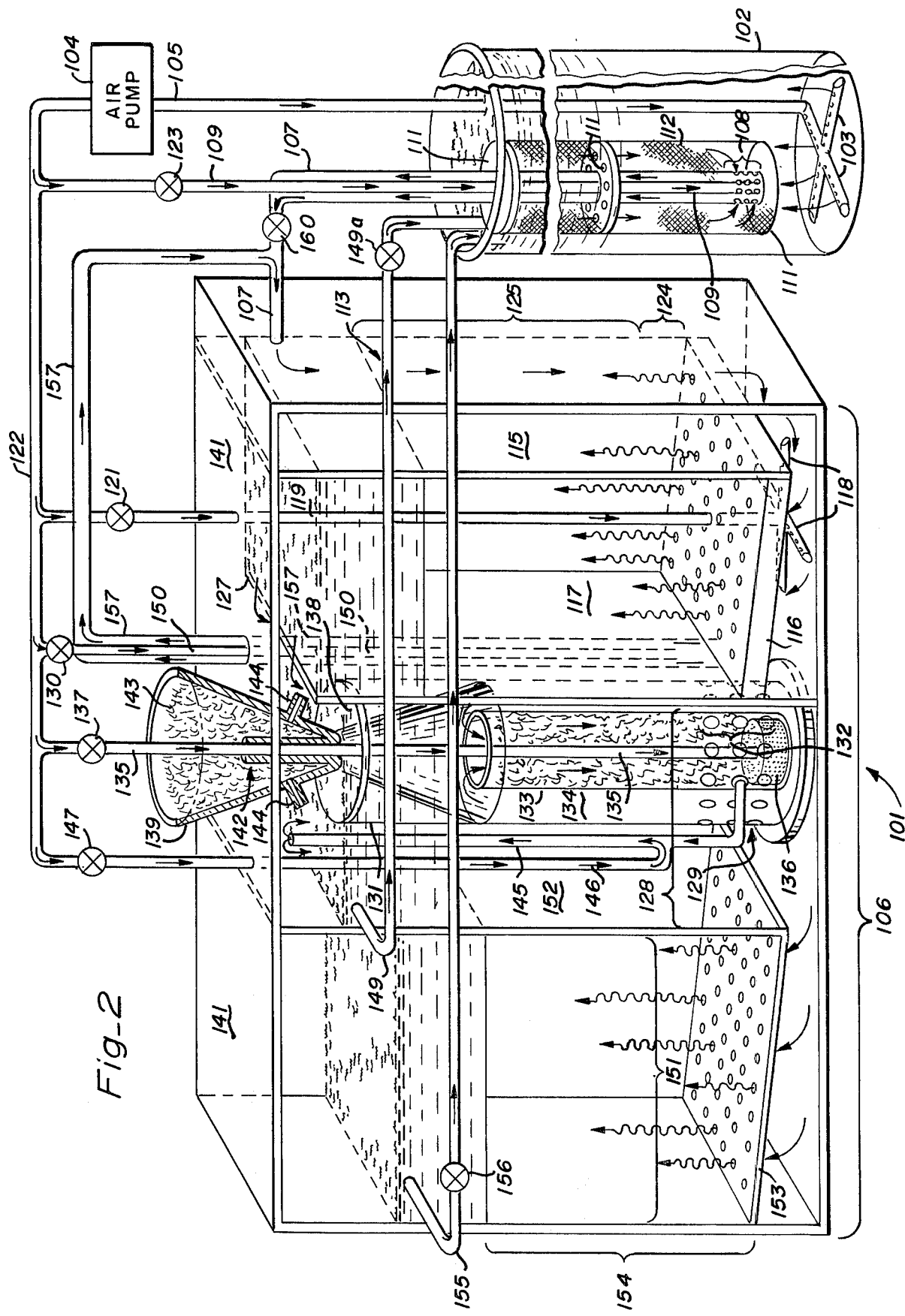
Fig_2

CONTAMINANT FILTER IN A CLOSED-LOOP AQUACULTURE SYSTEM

FIELD OF THE INVENTION

This invention relates to an improved apparatus and method for maintaining the purity of water which is used in a closed-loop aquaculture system. More specifically the invention is premised on the use of a polyurethane foam filter to remove harmful contaminants from the aquaculture system.

DESCRIPTION OF THE PRIOR ART

As the demand for food throughout the world increases, it becomes more and more important to find ways to more efficiently produce food to satisfy the demand. It has been proposed to grow monocultures of aquatic animals under controlled conditions to increase the production of high protein food for human consumption. The medium for supporting aquatic animals is, of course, water, and the life-support system may be open (i.e. water is constantly replenished from an outside source) or closed (i.e. the same water is recirculated through the system).

A closed-loop aquaculture system offers many advantages over an open system. For example, since water is continually reused, expenses for supplying, moving and storing water are minimized. Additionally, if water is to be heated or refrigerated, the expense involved in maintaining the temperature in a closed-loop system is considerably less since once a volume of the water is brought to the desired temperature, little energy is required to maintain that temperature. Also, undesirable temperature fluctuations are eliminated. Furthermore, food wastes are reduced because the food need not be flushed out of the tank as it is in systems wherein the water must be changed.

Other advantages of a closed-loop system include the ease of locating such aquaculture systems in geographical locations near the markets for the animal being grown rather than being limited to geographical locations near an estuary, ocean or where the water is free of contamination such as at relatively large distances from large metropolitan centers. With a closed-loop life support aquaculture system, geographical location is not important and one may culture marine prawns, fresh water prawns, marine fish, fresh water fish, etc. any place including arid areas with very little water. Closed-loop systems can utilize synthetic sea water or dilutes of natural or synthetic sea water (brackish). Once the water has been established in the system, marine or brackish water animals can be cultured hundreds of miles from the sea.

Also, recirculating the water enables the system to operate constantly without the necessity of changing water which may introduce unwanted contaminants such as raw sewage, or other pollutants. These contaminants are deleterious to most cultured subjects, particularly to decapod larvae, wherein even parts per billion may result in death. Thus, it is important to develop a closed-loop, aquaculture system which employs a water purification system which will maintain the water in a high state of purity removing any contaminants present or maintaining the contaminants at a non-harmful level.

Although a closed-loop aquaculture system may minimize the entrance of some undesired contaminants from outside sources, it has been discovered that contaminants such as pesticides, polychlorinated biphenyls (PCB's), and plasticizers such as phthalate esters still may enter a closed-loop system at harmful levels. In the past, there has been little control over these contaminants which generally arise from the water, the plastic piping or containers, and the food used in the closed-loop system. I have now discovered that these contaminants entering in this manner may be controlled using the process and apparatus of this invention.

Heretofore, only cumbersome closed-loop, life-support systems for the culture of aquatic animals have been proposed which include a water purification system having a biological filter, a resin base filter, a particulate filter, an intermediate sump, various positive displacement liquid pumps, and a protein skimmer. Such a system is disclosed in U.S. Pat. No. 3,661,262 issued May 9, 1972 to Sanders.

While the literature is replete with evidence indicating the harmful effects of chlorinated hydrocarbons such as DDT, DDE, aldrin, etc.; heavy metals such as mercury; and others, we have discovered that of particular harm to decapods such as prawns are the phthalate ester plasticizers which are extensively used in nearly all plastics, particularly in polyvinylidene chloride (PVC) and acrylics such as BAKELITE. Thus, these plasticizers are present in many of the components such as PVC tubing and acrylic tanks which are readily available for use in closed-loop, aquaculture systems. We have found that the presence of these plasticizers in the water is particularly deleterious to prawn larvae, even at levels of parts per billion.

It is known in the prior art to employ an open cell plastic foam to trap dirt and particles along with a charcoal cartridge to remove toxic wastes from aquariums. For example model 35F-520 3 stage Aquarium Power Filters, manufactured by Biozonics Corp., 15 Tech Circle, Natich, Massachusetts, may be used for fresh or salt water aquariums. This filter requires charcoal to remove some toxic products and the charcoal is discarded after use.

It is also suggested in the prior art that on a small scale, polyurethane foam may be utilized to analyze for heavy metals in water. See for example *Journal of the Chemical society (A)*, pages 1082–1085, published in 1970. It is also suggested that polyurethane foam may be used as an analytical tool to extract and recover polychlorinated biphenyls. See for example "The Extraction and Recovery of Polychlorinated Biphenyls (PCB) Using Polyurethane Foam" appearing in *Analytical Letters* 4 (12): pgs. 883–886, published in 1971. However, as pointed out in an article appearing in an *Environmental Letters* 4 (2): pgs. 117–135, in order to get a reasonable extraction or organochlorine pesticides from water by porous polyurethane foam a selective chromatographic grease was added to the polyurethane foam to obtain maximum absorption of the organochlorine pesticides.

I have now discovered a simple and novel closed-loop aquaculture process and apparatus which is able to remove not only harmful levels of chlorinated hydrocarbons and PCB's but also harmful levels of phalate esters, a phenomenon previously unknown in the art. The apparatus has the advantage of being reusable and not requiring the addition of a chromatographic grease or a similar additive to get the desired level of purification of the circulating water. Further, the closed-loop aquaculture system of this invention is a simple, relatively maintenance-free system.

SUMMARY OF THE INVENTION

This invention has two aspects; the first is an improved apparatus for purifying water used in a closed-loop aquaculture system as well as the system itself, while the second is an improved process for purifying water used in a closed-loop aquaculture system and an improved process for growing marine animals.

APPARATUS

The improvement of this invention involves the use of an open-cell, flexible polyurethane foam filter in an aquaculture system, the foam filter being made by reacting a polyhydroxylated ether with a diisocyanate such as tolylene diisocyanate in a suitable manner. Preferably about 60–85 parts by weight, preferably at least 80, of a polyhydroxylated polyether (e.g. poly(oxypropylene) glycol) is reacted with about 40–15 parts by weight (preferably 20 or less) of the tolylene diisocyanate, generally an 80/20 mixture of the 2,4 and 2,6 isomers. The polyurethane foam filter is positioned to be in liquid communication with the water passing through the water purification apparatus used in the aqauculture system. The polyurethane foam filter is particularly useful in combination with a biological filter in liquid communication with and up-stream of the polyurethane foam filter, especially when the biological filter has a means for adding oxygen directly to the filter. It has also been found that it is particularly preferred if the container used for maintaining the aquatic animals is made of non-contaminating material such as polyethylene, polypropylene, concrete, or tile.

PROCESS

In purifying water in a closed-loop aquaculture system, the improvement of this invention comprises passing the circulating water through an open-cell, polyurethane foam filter described above to maintain the level of toxic contaminants at a substantially non-harmful level. It has been found that this process works particularly well if the water is passed through the polyurethane foam block filter at a rate of less than about 0.8 mil. per minute per cubic centimeter of the polyurethane foam. One of the advantages of using the polyurethane foam filter of this invention is that it is readily reusable by passing an effective amount of a solvent, preferably a mixture of acetone and hexane, through the polyurethane foam filter to remove substantial amount of the contaminants present in the filter then again passing water through the polyurethane foam filter. A particularly valuable effect is achieved if the water is passed through a biological filter located upstream of the polyurethane foam filter while at the same time oxygen is directly added to the biological filter. Preferably the flow rate through the biological filter should be between about 0.14 and 0.8 milliliters (ml) per minute per cubic centimeter of the medium used in the biological filter. If the transfer lines used in the circulating system contain plasticizers such as phthalate esters, it is preferred to leach a substantial amount of the plasticizers from the transfer lines by passing water, preferably salt water, through the lines prior to putting marine animals in the system.

BRIEF DESCRIPTION OF THE DRAWINGS

FIG. 2 is a schematic line diagram, partly in perspective and partly in block diagram form, of a small aquaculture system incorporating a water purifier of the present invention.

DESCRIPTION OF THE PREFERRED EMBODIMENTS

Figure 1:
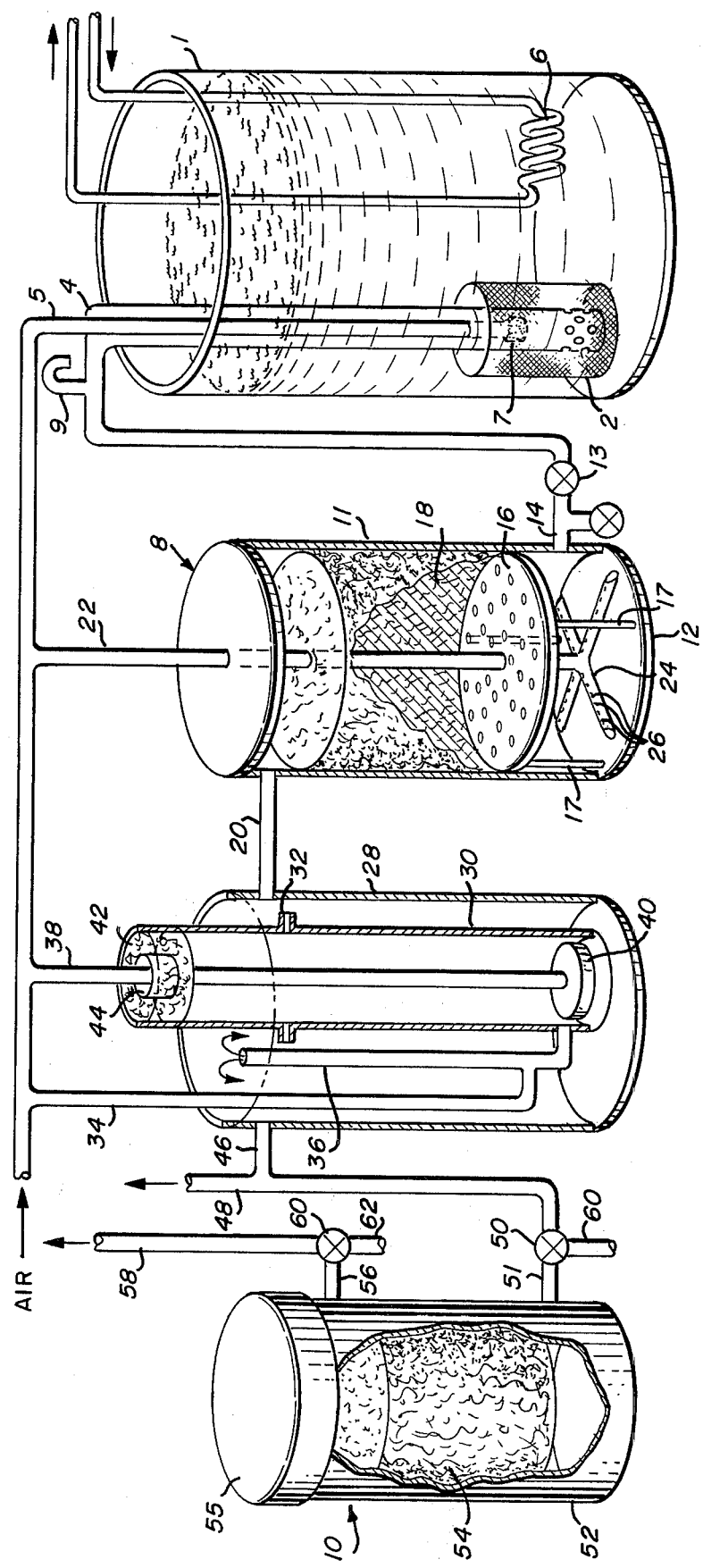
FIG. 1 is a simplified diagrammatical representation of the apparatus and process of this invention.

The system of this invention is much simpler than apparatus known in the art, such as the system of U.S. Pat. No. 3,661,262, in that there is no need for a sump to adjust for overflows of various parts of the system. In addition the apparatus of this invention may employ air lift pumps which are much cheaper and easier to use. Further, the system of this invention does not require an ultraviolet irradiator.

In FIG. 1, the aquatic animals (which may be either fresh water or salt water) such as prawn larvae, macrobrachium species, are placed in container 1 where they are retained and fed. They are retained by a screening device 2 on line 4 which allows water to pass into line 2 while retaining the animals in container 1. Such a screening device is fully described in U.S. Pat. application Ser. No. 512,384 filed Oct. 7, 1974 and is incorporated herein by reference. A temperature regulating means such as a heat exchanger 6 may be included in container 1 to maintain a constant temperature. Preferably the fluid passing through said heat exchanger is heated by solar heat.

The invention in this case is the apparatus which utilizes a polyurethane foam filter to remove a substantial amount of toxic contaminants from the system and maintain the level of these contaminants at a non-harmful level. The polyurethane foam may be used in either an open aquaculture system or a closed-loop system, but it is particularly suitable in the latter. The polyurethane foam filter is indicated in FIG. 1 as 10. In conjunction with the polyurethane foam filter 10 of this invention it is also useful to include a biological filter 8 along with a protein skimmer 9. Both of these items are up-stream from the polyurethane foam filter, that is they are located between the container 1 and the filter and the fluid from the system must pass through the biological filter 8 and the protein skimmer 9 before passing through the polyurethane foam filter. By placing the biological filter and protein skimmer up-stream of the polyurethane filter, substantially all particles which might plug the polyurethane foam are removed before passing water through the polyurethane foam toxic material filter 10. It is particularly valuable if the biological filter 8 is up-stream of the protein skimmer 9 as indicated in FIG. 1.

Although the design of the biological filter may be any known in the art, preferably the design of the biological filter comprises an elongated enclosure 11 being closed at the base 12, said enclosure having at least one liquid inlet 14 at the base 12 of enclosure 11, said enclosure being arranged to retain water when flowing in through the inlet valve 13, a liquid-permeable support means 16 (such as a perforated plate supported on legs 17) above said inlet, a porous medium 18 sufficient to grow nitrosomas and nitrobacter organisms supported on said support means 16, and a liquid outlet 20 located above said porous medium. Water is transferred to the biological filter by pumping air down line 5 to be released, e.g. through air stone 7, and causing the flow up the annulus between lines 4 and 5, air pressure being released at 9.

Particularly valuable in this particular invention is an apparatus by which air can be added directly to the biological filter. This air addition line is indicated as 22 in FIG. 1 and is particularly important in that the efficiency of the microorganisms in the biological filter is increased if the air is added directly to the biological filter instead of being added to the circulating fluid somewhere before the biological filter. The air is added through perforations 26 in cross arms 24. A biological filter of such design is more fully described in U.S. Pat. application Ser. No. 512,384 filed Oct. 7, 1974 and such description is incorporated herein by reference.

From biological filter 8, water passes through a water transfer means such as conduit 20 into the protein skimmer 9 which may be of any known design such as direct current or counter-current, as set forth in *Fish And Invertebrate Culture, Water Management In Closed Systems*, Stephen H. Spotte, Wiley-interscience, 1970, pp. 52–56. A simple counter-current design is shown in FIG. 1. Water is contained in enclosure 28 and enters inner tube 30 through apertures 32. Water is drawn down inner tube 30 by injecting air through line 34 to air lift water up line 36 and back into container 28. Air enters line 38 and exits air stone 40 to provide a counter-current flow of air to form a foam of organics which collects in region 42 after passing through aperture 44 around air line 38. Water exits from container 28 through outlet 46 and part returns to container 1 through line 48 while part goes through valve 50 to polyurethane foam filter 10.

The polyurethane foam filter will generally have an enclosure such as cylinder 52 which is closed at both ends and which houses the polyurethane foam 54 which will be snugly fitted in cylinder 52 filling the interior thereof and being securely fastened by frictional forces at the interior wall of the cylinder 52. Preferably the inflowing water enters through the base of the cylinder through water inlet 51 and exits via outlet 56 and returns to container 1 through line 58. Other suitable designs may be used as well. Using the described design the foam may readily be removed and cleaned if desired by lifting removable cap 55 from cylinder 52.

It may be valuable to include a solvent entry line 60 which ties into inlet 51 leading to the polyurethane filter 10. The use of this design, of course, assumes that the equipment contacted by the solvent will be solvent resistant. By including this line 60, a solvent can be employed to wash the polyurethane foam 54 to remove any contaminants that are present thereon. Solvent washing may be accomplished by stopping the water flow through the polyurethane foam, injecting the solvent into the inlet 51 through three way valve 50. The solvent passes through the polyurethane foam 54, out three-way valve 60 to the solvent exit line 62, and is discarded. Solvent is rinsed out of the system using ethanol then water, then the container 1 along with the water in the container is connected again to the system three-way valve 50, is adjusted to allow the flow through the transfer line 46 into the polyurethane filter 10 and valve 60 is adjusted to allow the flow through the transfer line 58 and into container 1.

Whether the foam is cleaned while in the system or removed first, the solvent used is preferably a mixture of acetone and hexane. Ratio of acetone to hexane may vary between 1:1 to 1:10 but preferably is 1:5. The volume of solvent used will generally be equal to at least about the volume of the foam up to 5 times the foam volume. Preferably a volume equal to about twice the foam volume will be used.

Referring now to FIG. 2 there is shown a small aquaculture system 101 incorporating the various features of the present invention. The aquaculture system includes an aquaculture tank 102 for containing a body of water for supporting a culture of aquatic animals including decapods, fish and the like. This system is particularly useful for raising macrobrachium species larvae. The water contained within the aquaculture tank 102 may be fresh water or salt water. In the case of salt water, it may be actual salt water from the sea or salt water manufactured by the addition of certain salts (e.g. Instant Ocean) to fresh water. The water within the tank 102 is preferably stirred and aerated by any means known in the art to be useful for that purpose. Preferably, an X-shaped perforated pipe structure 103 is disposed on the bottom of the tank 102 and supplied with an oxygenating gas such as air or oxygen from air pump 104 via an air line 105.

To retain the marine animals, which may be extremely small, it is generally necessary to use a screening device 112 to retain the animals in the container 102 while at the same time allowing water to freely be transferred through the rest of the system. A particularly preferred screening device is described in U.S. Pat. application Ser. No. 512,384 filed Oct. 7, 1974 and as much of that application as is pertinent is incorporated herein by reference.

Water is air lifted from the aquaculture tank 102 into a purifier system 106. More particularly the air lift system includes an air lift tube 107 which is perforated at 108 near its inner end. The lift tube 107 contains an air supply pipe 109, shown in FIG. 2 to be in coaxial relation. A cylindrical screen strainer 112 is disposed around the tube 107 and supported therefrom via at least two annular discs 111. The intermediate discs 111 are perforated or slit to allow flow of water therethrough in the axial direction. Air under pressure is forced down the air supply pipe out the end thereof into the annular space between the air lift tube 107 and the inner air pipe 109.

As the air travels up the annular space between the air supply pipe 109 and the air lift tube 107, water is lifted up the pipe 107 and into the top of a first chamber 113 and into the bottom of a biological filter chamber 114 by flowing under the lower tip of a vertical septum 115 separating the input chamber 113 from the biological filter chamber 114.

The water passes through a biological filter at this point to oxidize the undesirable ammonia produced, i.e., by breakdown of organic substances in the culture media and from fish excrement. The ammonia is first oxidized to nitrite and the nitrite is then oxidized to nitrate by known reactions further discussed in the *Journal of Water Pollution Control Fed.*, 44(11), 1972, pp. 2086–2102. As much of that article as is pertinent is incorporated herein by reference.

The biological filter 114 may be of any known design or configuration, but will preferably included as shown in FIG. 2, a water-permeable support means, preferably a perforated or slatted floor plate 116 which may be connected between the lower edge of the system 115 and the other side wall 117 of the biological filter chamber 114. The water in the biological filter 114 flows through the biological filter medium supported on the floor plate 116 as a result of a potential water level difference between the biological filter chamber 114 and the first chamber 113. In addition, air bubbles are released at the base of the perforated floor 116 via aerator 118 similar to the aerator 103 in the aquaculture tank 102. The aerator may be of any design suitable for adding an oxygenating gas directly to the filter in a substantially uniform fashion. This includes designs such as a plate perforated on the upper side, an annulus or series of annuli having perforations leading from the inside of the annuli to the water, or a multiarmed aerator, such as a cross arm aerator 118. The direct addition of air to the biological filter results in maintaining the filter in aerobic condition more efficiently.

Air is supplied to the cross arm aerator 118 via an air line 119 which is connected to the air pump 104 via the intermediary of a valve 121 and air manifold 122. Similarly, the air supply pipe 109 for the air lift pump in the aquaculture tank 102 is connected to the air manifold 122 via valve 123.

The medium employed in the biological filter may be any which is known in the art which will support the microorganisms which provide the necessary oxidative action. For example, the biological filter 114 may include a first layer of filter medium 124, as of gravel and dolomite, for maintaining a desired pH of the water in the range of 7.0 to 9.0 which is acceptable for the bacterial activity of the biological filter 114. Biological filter layer 125 is disposed above the dolomite layer 124 and may comprise any suitable medium such as gravel or open cell polyurethane foam. The purpose of the biological filter medium 125 is to serve as a substrate for attachment of nitrifying bacteria. It has been found that conventional polyurethane foam having a density of 0.0580 grams per cubic centimeter has approximately 5 times the surface area of an equivalent volume of gravel and thus provides a greater activity than heretofore known. The gravel and dolomite layer 124 serves the additional purpose of filtering out debris which could otherwise plug the pores of the polyurethane foam layer 125 which may be disposed above the dolomite layer 124. Further, the arrangement shown in FIG. 2 wherein the water flow is against gravity is preferable since any debris which is filtered out by the gravel tends to drop to the bottom of the biological filter 114 and out of the gravel, thus further prolonging the flow rate through the biological filter media.

Water that has passed through the biological filter 114 spills over the upper lip 127 of septum wall 117 into a protein skimmer chamber 128. Preferably, a bypass water line 157 is connected between the protein skimmer chamber 128 and the input line 107 to the water purifier 106. The bypass line 157 includes an air lift line 150 coaxially disposed within that portion of the bypass line 157 that is inserted within the skimmer chamber 128. The air lift line 150 is connected to the air supply manifold 122 via valve 130. The purpose of the bypass line 157 is to permit water circulation through the biological filter when the water purifier 106 is disconnected from the aquaculture tank 102 or the aquaculture tank 102 is empty. Unless water flow is maintained through the biological filter 114, the bacteria die and the filter becomes inoperative. Therefore, to maintain the activity of the biological filter 114, the bypass line 157 permits recirculation of the water through filter 114, when the main aquaculture tank 102 is disconnected while harvesting the aquatic animals or is empty for other reasons. To recirculate the water through the biological filter 114 the return valves 149 and 156 are closed and the input line 107 is closed via closure of valve 160. Air lift valve 130 is opened.

The protein skimmer chamber 128 may be of generally conventional construction, for example as disclosed in U.S. Pat. No. 3,616,919 issued Nov. 2, 1971 to Feddern or at pp. 52–56 of *FISH AND INVERTEBRATE CULTURE Water Management In Closed Systems* by Stephen H. Spotte, Wiley-Interscience, 1970. In FIG. 2, a preferable design shows protein skimmer 128 which includes a tubular housing 131 which is perforated at its lower end with an array of perforations 132. A second tube 133 is coaxially disposed within the outside tube 131 to define an annular passage 134 in the space between the inner tube 133 and the outer tube 131. The upper end of the inner tube 133 is open and an air inlet 135 is coaxially disposed of the inner tube 133 and extends axially thereof to an air stone 136 disposed at the bottom of the inner tube 133. Air line 135 is connected to the air manifold 122 via valve 137.

The upper end of the outer tube 131 is closed off by a centrally apertured disc 138 and a double ended funnel 139 is coaxially disposed surrounding the air line 135 and above the open end of the inner tube 133. The funnel 139 is sealed at its waist to the central aperture in the end closing wall 138. In addition, the funnel 139 is sealed to an aperture in the upper cover plate 141 of the purifier 106. The funnel 139 includes an axially directed tubular portion 142 coaxially extending upward from the neck portion of the funnel structure and coaxially surrounding the air line 135 in slightly spaced relation therefrom to define an annular passage between the tubular extension 142 and the air line 135. A collecting substrate, such as glass wool 143, is disposed within the upper end of the funnel 139. A pair of drain ports 144 are provided in the bottom of the upper funnel portion for draining excess liquid back into the chamber 128.

Water is air lifted from the bottom of the inner tube 133 back to the skimmer chamber 128 via an air lift pump comprising pump line 145 connected into the base of the inner tube 133 and an air line 146 which is connected to air manifold 122 via valve 147. The air line 146 feeds air into the water line 145 for lifting the water from the inside of the tube 133 back to the protein skimmer chamber 128. A gravity fed water return line 149 returns water from the protein skimmer chamber 128 back to the aquaculture tank 105, such return line 149 including a valve 149a.

In operation, water is pumped through the protein skimmer by means of the air lift pump consisting of pump line 145 and air line 146. The water flows into the protein skimmer chamber 128 over the septum wall 117 and into the space between the walls of the protein skimmer chamber 128 and the centrally disposed protein skimmer 129. The water flows down around the outside of the outer tube 131 and into the annular space 134 via the perforations 132. The water then travels up the outside of the inner tube 133 to the upper open end thereof and thence down the inside of the inner tube 133 to the output line 145. The air stone 136 is supplied with air via air line 135 and produces a rising cloud of small air bubbles in counter flowing relation to the downward flowing water stream.

These counter flowing streams increase the contact between the air bubbles and the water. Suspended and dissolved organic matter is surface active and thus accumulates at the air-water interface of each of the bubbles and therefore causes a foam to be produced at the upper surface of the water, i.e., at the upper end of the open tube 133. This foam passes upwardly through the annular space between the air line 135 and the tubular extension 142 and the into the upper funnel 139 for collection on the glass wool 143. The excess water returns to the chamber 128 via the drains 144. The glass wool fibrous material is periodically replaced to maintain efficient removal of the foam material.

Most of the water flow through the purifier 106 is returned to the aquaculture tank 102 via the gravity fed return line 149. However, a portion of the water in the protein skimmer chamber 128 passes into filter chamber 151 by flowing under the lower lip of a dividing septum 152 separating the protein skimmer chamber 128 and the chamber 151. The foam chamber 151 includes a perforated lower floor member 153 which serves to support a layer of polyurethane open-cell foam 154.

The polyurethane foam which is used in this apparatus is an open-cell, flexible polyurethane foam which is prepared by reacting a diisocyanate with a polyhydroxylated ether, both components being commercially available. The diisocyanates which may be used include those which are commonly known in the art such as those set forth at p. 13 of POLYURETHANES from the Reinhold Plastics Applications Series, (1957) or at pp. 347–348 of Polyurethane Chemistry and Technology, Part I, J. H. Saunders and K. C. Frisch, Interscience (1969); e.g. 2,4-tolylene diisocyanate, 2,6-tolylene diisocyanate, or mixtures of the two such as a 65% 2,4/35% 2,6 mixture or preferably an 80%, 2,4/20% 2,6 mixture. The hydroxyl-containing compounds useful for reacting with the diisocyanates include glycols, polyols, hydroxylated polyethers, and the like, particularly those set forth in POLYURETHANES CHEMISTRY AND TECHNOLOGY, infra pp. 349–350. Thus compounds such as ethylene glycol, propylene glycol, glycerol, and the like are suitable. Particularly desirable are poly(oxypropylene) glycol of molecular weight of 400–4000 or mixtures of poly(oxypropylene)glycol and poly(oxyethylene) glycol, especially the former. The two polyurethane reactants are reacted by any means known in the art to produce an open-cell, flexible polyurethane foam block and generally the reactions includes a proper blowing agent, a suitable catalyst, and surfactants to control cell structure. Reactions and conditions are more completely discussed in Chapter V of Polyurethane Chemistry and Technology, infra and that chapter is incorporated herein by reference. It is to be understood that "open-cell" means that a fluid may freely flow through the polyurethane foam block by applying a pressure differential across the foam block. The foam may be a "block" which has a specific shape of its own and may be cubical, polyhedral, spherical, etc., preferably cylindrical. To form the open-cell, polyurethane foams useful in this invention, generally a molar excess of the hydroxyl containing compound is reacted with the diisocyanate under the desired conditions. For example anywhere from 60 to 85 percent by weight (%w) of a hydroxylated polyether may be reacted with about 40 to 15%w of the diisocyanate along with the necessary catalysts and foaming agents. The open-cell, polyurethane foams used in the apparatus of this invention are often readily on the open market and for ease, they may be purchased for use. It has been found that a particularly preferred foam is prepared by reacting 127 pounds of poly(oxypropylene) glycol with 27.9 pounds of tolylene diisocyanate, i.e. about 81%w of the glycol and 19% of the diisocyanate. Such a foam may be obtained from United Foam Co., Los Angeles, California and is referred to as No. 2064.

Referring again to FIG. 2, the polyurethane foam layer 154 serves to extract certain toxic chemicals from the water. Toxic chemicals which are removed include for example, chlorinated hydrocarbons, PCB's, phthalate esters and certain toxic heavy metals, such as iron, copper, etc. The output water flow from the foam chamber 151 is extracted via gravity fed return water line 155 and fed back to the aquaculture tank 102. A valve 156 is provided in the return line 155 for controlling the back pressure on the chamber 151. The output line 155 is preferably connected into the foam chamber 151 at a point lower than the water level maintained in the protein skimmer chamber 128 so that there is a small gravitational head on the return line 155. Thus, the return flow rate is readily connected in line 155 via a valve 156. In addition, valve 156 permits adjustments of the proportion of the water returned via line 155 and that returned by line 149.

As the size of the closed-loop aquaculture system is increased, for ease of preparation and for strength in construction of the system it is preferred to employ separate units as the protein skimmer, biological filter and polyurethane foam filter, as shown diagramically in FIG. 1. Generally the container 1 will be cylindrical and preferably will be constructed of natural polypropylene. Each of the biological filter, the protein skimmer, and the container for the polyurethane foam filter will also be of cylindrical configuration, and will preferably be constructed of natural polypropylene, but will incorporate the principles of operation set forth in the discussion of FIGS. 1 and 2.

Since we have found that phthalate esters may enter the system by leaching from the plastic (e.g. PVC) pipes or containers, we have found that the level of contaminants is reduced if the system is first leached by passing water through the system for a period of time such as about 1 day to about 7 days at temperatures ranging from about 30°C to about 50°C. Preferably, the water employed has a salinity content of 1 to 100 parts per thousand (ppt). 30ppt Is found to be particularly suitable. Because of its low cost rock salt has been found particularly useful to provide the salinity, although any similar salt may be used. The leaching is carried out prior to placing the marine animals in the container and prior to placing the biological filter or the polyurethane foam into the system. Once the leaching period is finished, a fresh batch of water is placed in the system and the animals are then cultured.

Although by prior leaching of the system, about 85–90% of the plasticizers may be removed, additional plasticizer leaches out as the system operates, thus it is important to utilize the polyurethane foam as described above to remove any of these plasticizers.

The following experiments are presented to set forth parameters of operation of the process of this invention and are meant to be demonstrative of preferred aspects of the invention but are not to be read as limitations on the invention.

EXAMPLE I

An experiment was run to determine whether a polyester based polyurethane foam would effectively remove phthalate ester from a solution in water. It was found that the polyester based polyurethane could not reasonably be utilized because the removal was too low even at a very slow flow rate to be reliable in the process of this invention.

333 ml. of a stock solution containing 1.0 ppm of dioctyl phthalate was added to each of 3 columns of polyurethane foam having the following characteristics:

|   | Size (l×d) | Density (g/cm³) | Flow Rate (ml/min) | Composition | % Removed |
|---|---|---|---|---|---|
| A. | 14.5cm×1.9cm | 0.0584 | 100 | 81% PPG** 19% DIC* | 42 |
| B. | 14.5cm×1.9cm | 0.0350 | 100 | 81% PPG** 19% DIC* | 42 |
| C. | 14.5cm×1.9cm | 0.0240 | 100 | 81% PPG  19% DIC* | 26 |
| D. | 55mm×1.9cm | 0.0970 | *** | Ester-Based Foam | 19 |

*DIC=80/20 mixture of 2,4-and 2,6-isomers of tolylene diisocyanate.
**Poly(oxypropylene) glycol
***Flow rate=100 drops/min It was found that even at the extremely slow flow rate the polyester based polyurethane foam removed only 18.5% of the phthalate ester, B, and C, all polyether-based foams removed 42% and 26%, respectively. Since recovery was so low, no further experiments were done using the polyester based foam.

EXAMPLE II

Tests were run to attempt to determine the relationship between flow rate, density of the foam, volume of the foam, and recovery of phthalate ester from water. The density of the open-cell polyurethane foam used in this invention must, of course, be such that water may flow through the foam at the desired rate, i.e. a rate which allows removal of a substantial amount of the contaminants in passing through the foam once. The density of the foam may vary between about 0.0200 to about 0.0800 grams/cubic centimeter, (g/cc) preferably the density will be about 0.035 to about 0.060. A foam having a density of about 0.0584 is particularly effective. It has been found that the flow rate through the foam affects the amount of contaminants which are removed, that is, the faster the water goes through foam fewer contaminants are trapped by the foam. The mechanism of removal is not fully understood at this time. The flow is kept at a level at which contaminants are effectively removed. This generally is from about 0.1 to about 1.0 milliliters of water per minute per cc of foam. Preferably the rate is about 0.8 ml/min/cc of foam. In one experiment 250 mls of 1ppm solution of dioctyl phthalate was passed through a polyurethane foam plugs A, B, and C each having a density of 0.0584 g/cm³, dimensions of 14.5 cm long × 1.9 cm in diameter, and a composition of 81%w poly(oxypropylene) glycol and 19%w diisocyanate. As the flow rate through the foam increased, the % of the phthalate ester removed decreased as shown in Table II.

Table II

|   | Flow Rate (Ml/min) | % Removal |
|---|---|---|
| A. | 28 | 81.9 |
| B. | 100 | 42.0 |
| C. | 184 | 3.13 |

From this it was calculated that it is preferable to keep the flow rate through the foam at 0.8ml/min/cc of foam. Generally, it is found that the configuration of the plug has little detectable effect on the recovery. If the ratio of flow rate to volume is the same, the recovery is about the same.

EXAMPLE III

Further work was done to determine whether the foam shows a maximum absorption on the part of the polyurethane foam. It appears that there is an equilibrium point reached between the amount removed and the amount present in solution. This means that in the closed-loop aquaculture system, once the equilibrium point is reached, the foam should be rejuvinated by treating with a solvent, such as a hexane acetone mixture as discussed above. From experiments run, it appears that the total amount of phthalate ester which can be removed by an ether based polyurethane foam is related to the ether content but the relation is not clear. In one experiment, a series of solutions of dioctylphthalate was passed through a foam plug having a volume of 41cc(14.5cm×1.9cm) at a rate of 100ml/min. The foam plug has a density of 0.0584 g/cc and was prepared from an 81% poly(oxypropylene) glycol/19% diisocyanate reaction mixture. Table III sets forth the results. For each part of runs 100ml containing the $\mu g$ indicated were passed through the plug in 1 minute. The eluate was analyzed for the phthalate ester and the foam was solvent treated to detect the amount retained in the foam. The two numbers checked quite closely. At this flow rate there appears to be an equilibrium between removal and amount present in solution, with the foam always removing about 40 to 50% of the phthalate ester originally present.

Table III

| $\mu g$ | $\mu g$ removed | % removal by foam |
|---|---|---|
| 968 | 445 | 46 |
| 396 | 166 | 42 |
| 253 | 137 | 50 |
| 140 | 101 | 72 |
| 32 | 27 | 83 |

I claim as my invention:

1. An aquaculture apparatus which comprises a container to hold water in marine animals; a screening device to retain said marine animals in said container while allowing water to pass therethrough; a biological filter comprising (a) an elongated enclosure being closed at the base, said enclosure (i) having at least one liquid inlet at the base of said enclosure and (ii) being arranged to retain water when flowing in through the inlet, (b) a liquid permeable support means above said inlet, (c) a porous medium sufficient to grow nitrosomonas and nitrobacter organisms on said support means, and (d) a liquid outlet located above said porous medium;

an open-cell polyurethane foam filter made by reacting a poly(oxypropylene) glycol with a tolylene diisocyanate;

water transfer means interconnecting said container, biological filter, and said polyurethane foam filter and pump means to circulate said water from said container through said screening device, biological filter, and polyurethane foam filter in sequence and back to said container.

2. The apparatus of claim 1 wherein said diisocyanate is a mixture of 80 parts 2,4-tolylene diisocyanate and 20 parts 2,6-tolylene diisocyanate.

3. The apparatus of claim 2 wherein about 60 to 85 parts by weight of said glycol are reacted with about 40 to 15 parts of said diisocyanate mixture.

4. The apparatus of claim 1 which includes a protein skimmer between said biological filter and said foam filter along with water transfer means connecting said biological filter to said protein skimmer and connecting said protein skimmer to said foam filter.

5. The apparatus of claim 4 wherein said container, said enclosure of said biological filter, and said protein skimmer are made of natural polypropylene.

6. A process for raising aquatic animals which comprises placing said animals in suitable water in a container;

retaining said animals in said container;

passing said water sequentially through (A) a biological filter which comprises (a) an elongated enclosure being closed at the base, said enclosure (i) having at least one liquid inlet at the base of said enclosure and (ii) being arranged to retain water when flowing in through the inlet, (b) a liquid-permeable support means above said inlet, (c) a porous medium sufficient to grow nitrosomonas and nitrobacter organisms on said support means, and (d) a liquid outlet located above said porous medium, so that ammonia and nitrites are converted to nitrates, (B) a protein skimmer, and (C) an open-cell polyurethane foam filter made by reacting a poly(oxypropylene) glycol with a tolylene diisocyanate;

returning said water to said container; and feeding said animal.

7. The process of claim 6 which comprises in addition, prior to placing said animals in the water in said container and prior to activating said biological filter, passing water through all of said components to leach plasticizers from the components and discarding the resulting water.

8. The process of claim 6 wherein said water is passed through said biological filter and through said polyurethane foam filter at a rate of about 0.1 to about 1.0 milliliters per min per cubic centimeter biological filter medium or polyurethane foam, respectively.

9. The process of claim 8 wherein said rate of flow through said biological filter is between 0.15 and 0.8 milliliters per minute per cubic centimeter of biological filter medium and said rate of flow through said polyurethane foam filter is 0.8 milliliters per minute per cubic centimeter of foam or less.

10. The process of claim 6 wherein when said polyurethane foam has retained a substantial amount of contaminants, said foam is cleaned by stopping the flow of water through said foam, passing a solvent through said foam to remove retained contaminants, removing the solvent from the foam; and discarding the contaminated solvent.

11. The process of claim 10 wherein said solvent is a mixture of acetone and hexane.

12. A process for purifying water in a closed-loop aquaculture system which comprises passing said water through a biological filter comprising an elongated enclosure closed at the base, said enclosure (i) having at least one liquid inlet at the base of said enclosure and (ii) being arranged to retain water when flowing in through the inlet, in liquid permeable support means above said inlet, a porous medium sufficient to grow nitrosomonas and nitrobacter organisms supported on said support means, and a liquid outlet located above said porous medium, to transform harmful levels of ammonia and nitrites to nitrates;

passing said water through a protein skimmer to remove dissolved organics; and passing said water through an open-cell polyurethane foam filter to remove dissolved contaminants, said polyurethane foam filter made by reacting a poly(oxypropylene) glycol and tolylene diisocyanate.

13. The process of claim 12 wherein said water is passed through said biological filter at a rate of about 0.1 to 1.0 milliliters per minute per cubic centimeter of biological filter medium and through said polyurethane foam filter at a rate of 0.1 to 1.0 milliliters per minute per cubic centimer of foam.

14. The process of claim 12 wherein said polyurethane has absorbed a substantial amount of contaminants, the flow of water therethrough is stopped, a solvent is passed through the foam to remove the contaminants, said solvent is removed from the foam, and said solvent is discarded.

15. The process of claim 12 wherein said solvent is a mixture of acetone and hexane.

* * * * *

UNITED STATES PATENT OFFICE
CERTIFICATE OF CORRECTION

Patent No. 3,957,017  Dated May 18, 1976

Inventor(s) GARIBALDI M. CARMIGNANI et al

It is certified that error appears in the above-identified patent and that said Letters Patent are hereby corrected as shown below:

Column 12, line 55, change "a container to hold water in marine animals" to --a container to hold water and marine animals--.

Column 14, line 27, change "in through the inlet, in" to --in through the inlet, a--.

Column 14, line 44, change "per cubic centimer of foam" to --per cubic centimeter of foam--.

Signed and Sealed this

Eleventh Day of January 1977

[SEAL]

Attest:

RUTH C. MASON
*Attesting Officer*

C. MARSHALL DANN
*Commissioner of Patents and Trademarks*